(12) United States Patent
Cortese

(10) Patent No.: US 7,464,947 B2
(45) Date of Patent: Dec. 16, 2008

(54) HAND TRUCK CAPABLE OF MULTI-DIRECTIONAL MOVEMENT

(76) Inventor: Richard Lewis Cortese, 29 Lynn Street, Lamar, CO (US) 81052

( * ) Notice: Subject to any disclaimer, the term of this patent is extended or adjusted under 35 U.S.C. 154(b) by 429 days.

(21) Appl. No.: 11/162,026

(22) Filed: Aug. 25, 2005

(65) Prior Publication Data

US 2006/0061053 A1    Mar. 23, 2006

Related U.S. Application Data

(60) Provisional application No. 60/612,825, filed on Sep. 23, 2004.

(51) Int. Cl.
*B62B 1/12* (2006.01)
(52) U.S. Cl. ............... 280/47.27; 280/47.131; 280/47.18; 280/646; 280/652
(58) Field of Classification Search ............ 280/47.27, 280/47.11, 47.131, 47.17, 47.18, 47.24, 47.28, 280/47.29, 47.34, 38, 645, 646, 652, 659; 403/96
See application file for complete search history.

(56) References Cited

U.S. PATENT DOCUMENTS

| | | | | |
|---|---|---|---|---|
| 2,235,044 A * | 3/1941 | Ronning | ................. | 280/47.11 |
| 2,800,336 A * | 7/1957 | Major et al. | ............. | 280/47.11 |
| 2,884,257 A | 4/1959 | Menne | ......................... | 280/40 |
| 3,166,339 A * | 1/1965 | Earley | ......................... | 280/654 |
| 3,288,481 A * | 11/1966 | Meyers | .................... | 280/47.27 |
| 3,436,092 A * | 4/1969 | Werner | ........................ | 280/651 |
| 3,659,867 A * | 5/1972 | Curry | ......................... | 280/645 |
| 3,666,285 A | 5/1972 | Fertig | ....................... | 280/47.12 |
| 3,729,209 A | 4/1973 | Litz | .......................... | 280/36 R |
| 4,003,584 A | 1/1977 | Zelli | ........................... | 280/91 |
| 4,460,189 A * | 7/1984 | Goff | ......................... | 280/47.27 |
| 4,854,804 A * | 8/1989 | Mayle | ......................... | 414/469 |
| 5,263,727 A | 11/1993 | Libit et al. | .................... | 280/40 |
| 5,624,199 A * | 4/1997 | Cheng | ........................ | 403/100 |
| 6,039,332 A | 3/2000 | Austin | ...................... | 280/47.17 |
| 6,186,523 B1 | 2/2001 | Aielli | ....................... | 280/47.31 |
| 6,367,822 B1 * | 4/2002 | Hutchins | .................. | 280/47.24 |
| 6,422,152 B1 | 7/2002 | Rowe | .......................... | 104/121 |
| 6,425,724 B1 * | 7/2002 | Williamson | ................. | 414/490 |
| 6,450,514 B1 | 9/2002 | Ronca | ...................... | 280/79.11 |
| 6,663,120 B1 | 12/2003 | Fagerqvist | .............. | 280/47.27 |
| 6,874,799 B2 * | 4/2005 | Robberson et al. | ....... | 280/47.27 |

* cited by examiner

*Primary Examiner*—Christopher Ellis
*Assistant Examiner*—John D Walters
(74) *Attorney, Agent, or Firm*—Brenda L. Speer, LLC; Brenda L. Speer

(57) ABSTRACT

The hand truck or dolly of the present invention is capable of multi-directional movement and provides an operator with complete control of movement and directional choice for the hand truck without having to remove his hands from a handgrip location to achieve mechanical adjustments of the wheels. Rather, an operator may adjust a wheel index position on-the-fly by means of a trigger assembly to rotate a wheel assembly about a vertical axis of rotation within a range of motion of approximately 100 degrees. The two, independent wheel assemblies of the hand truck of the present invention achieve multi-directional movement through positioning of the wheels in a standard index position allowing for forward and backward movement, a lateral index position allowing for lateral, or side to side, movement, or a rotational index position allowing for rotational movement, such as for cornering and circular movement.

12 Claims, 6 Drawing Sheets

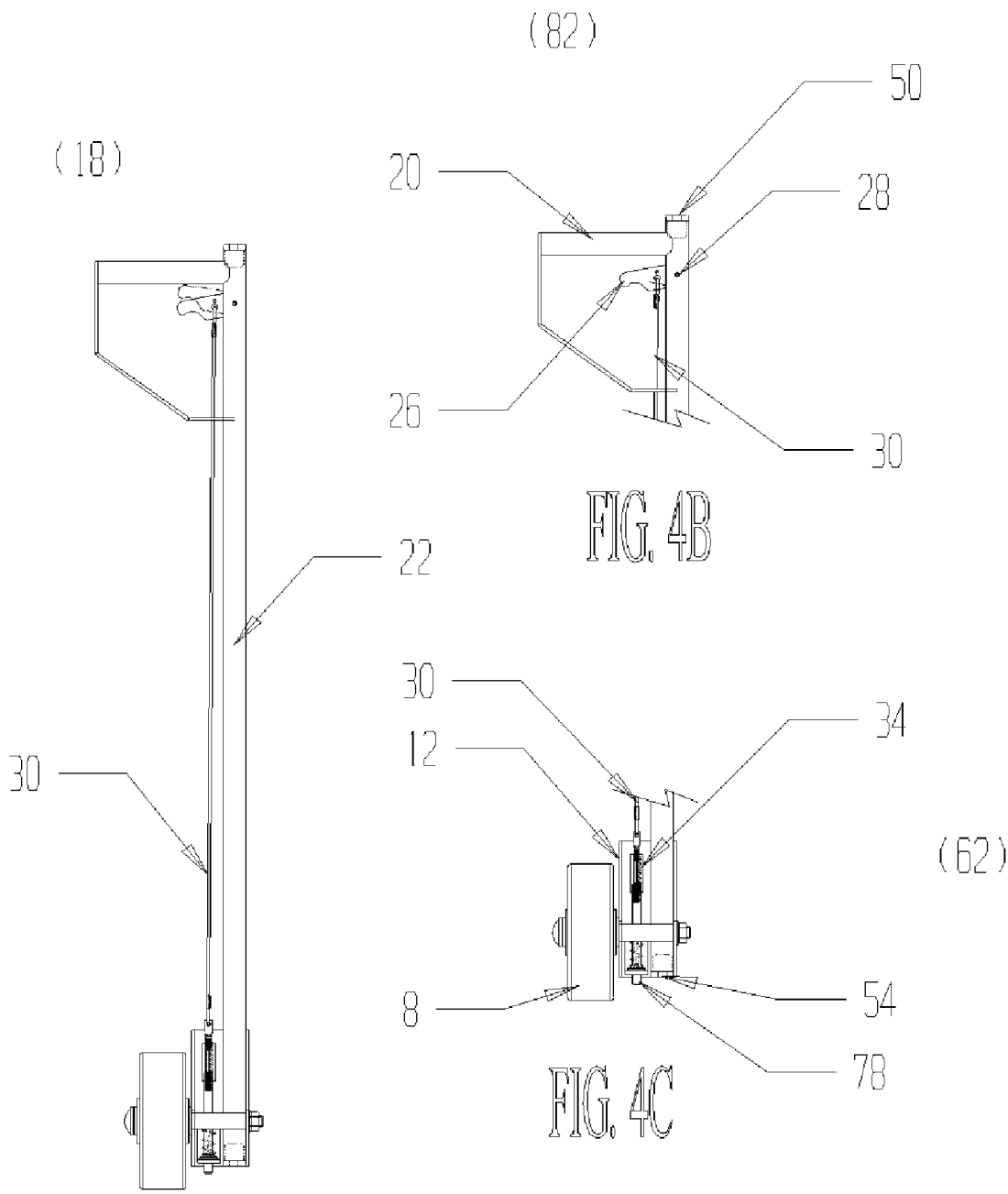

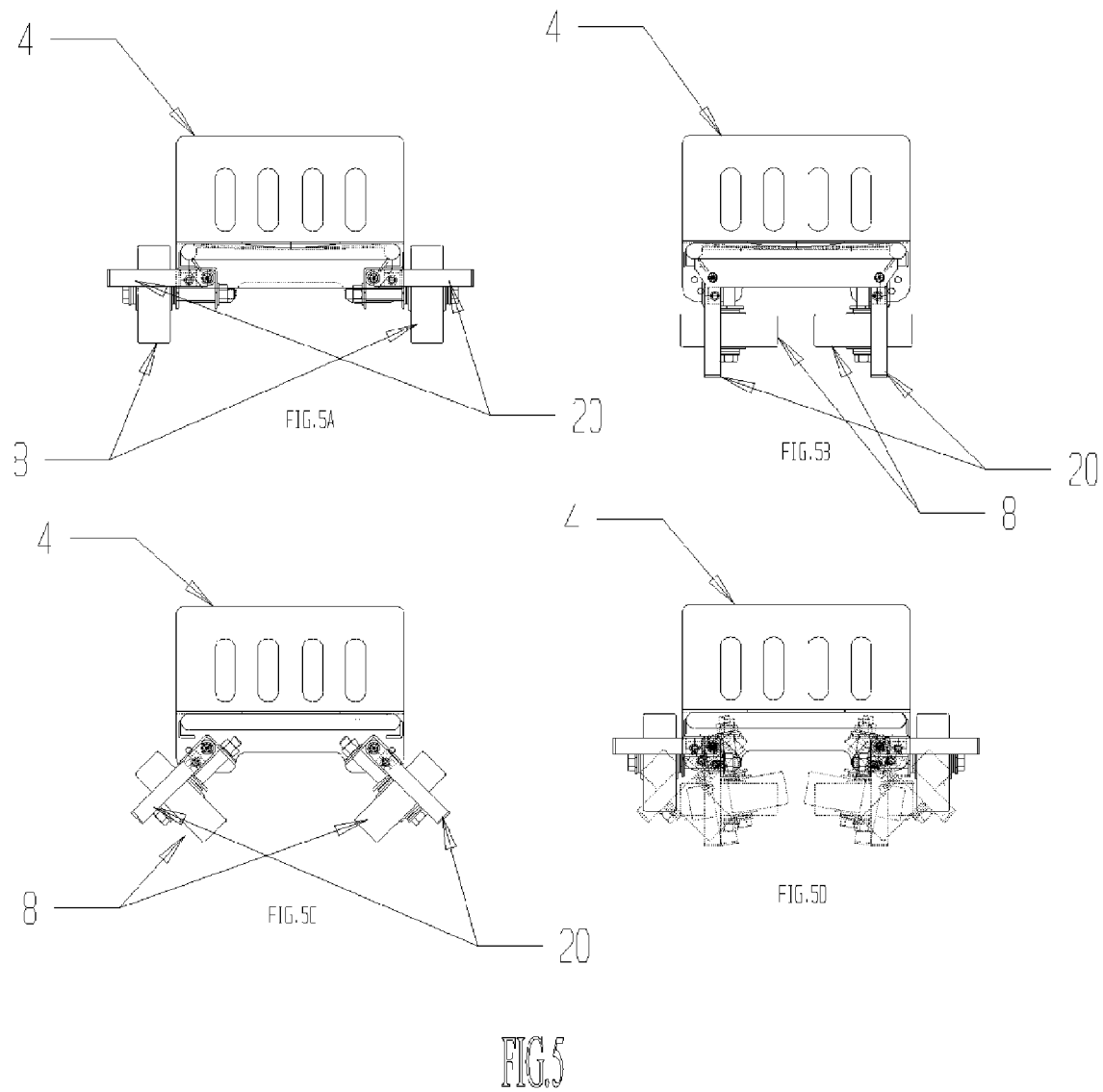

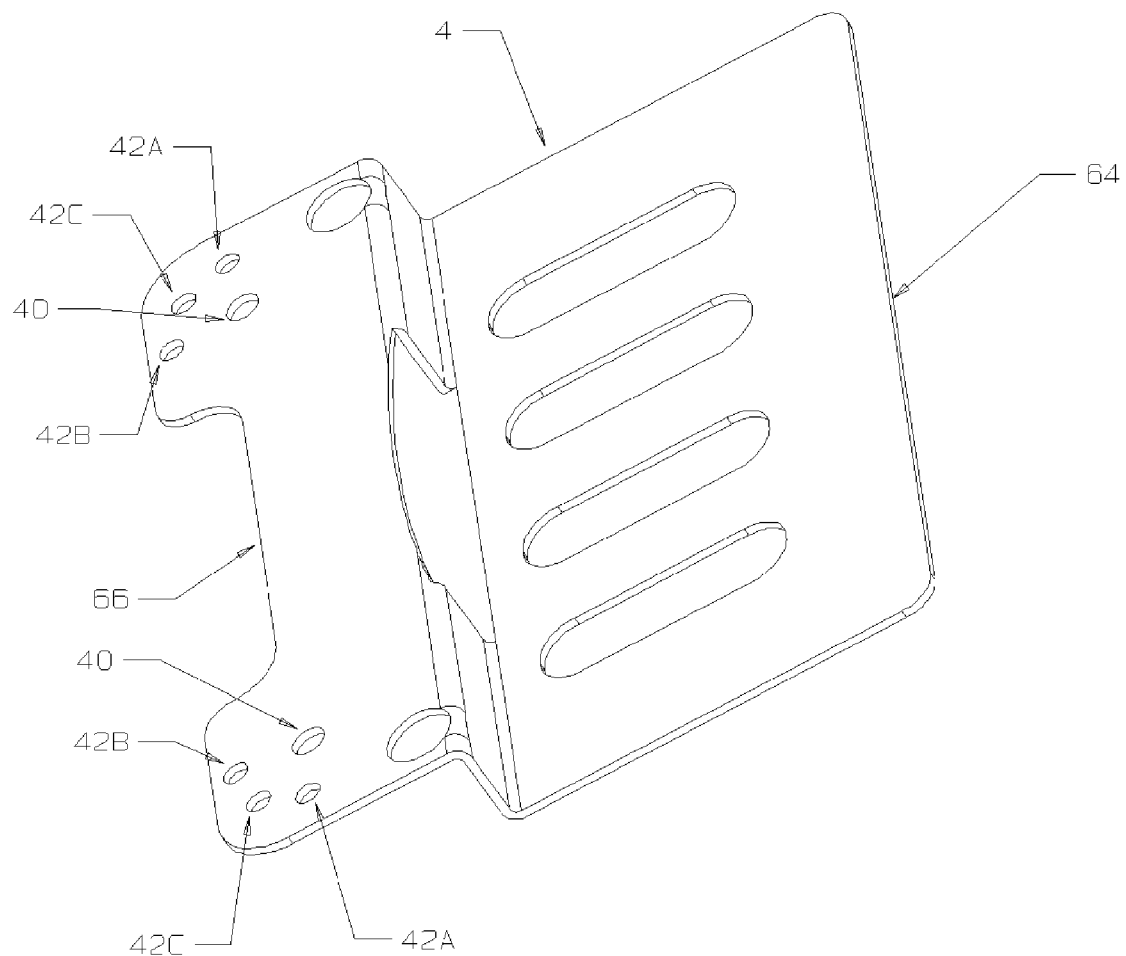
FIG. 6A
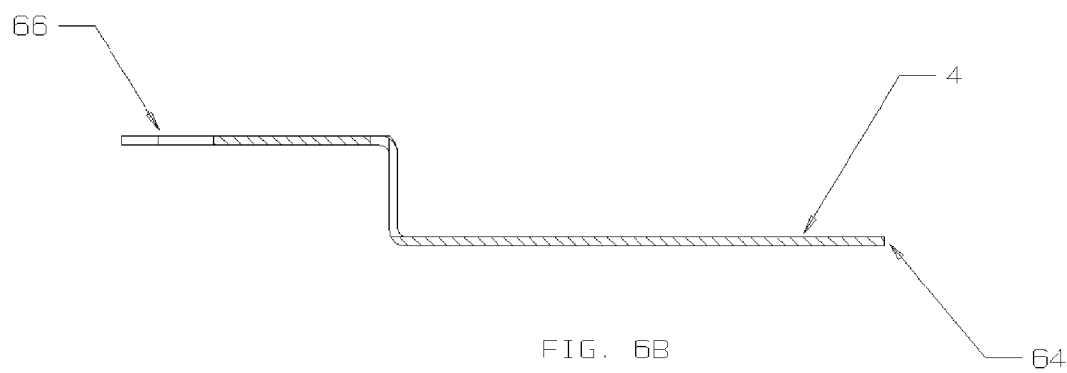
FIG. 6B
FIG. 6

HAND TRUCK CAPABLE OF MULTI-DIRECTIONAL MOVEMENT

FIELD OF THE INVENTION

The field of the invention relates to a hand truck capable of multi-directional movement.

BACKGROUND OF THE INVENTION

Although there are numerous types of hand trucks or dollies, each type tends to fulfill only a specific, limited purpose. In contrast, the two-wheeled hand truck of the present invention is capable of multi-directional movement and allows an operator to move the hand truck forward and backward, side to side and about an axis of rotation through reconfiguration of the wheels on-the-fly by means of a trigger assembly.

Prior art patents include the device of U.S. Pat. No. 2,884,257 which is a two-wheeled hand truck peculiarly adapted for the display and transportation of outboard motors. In contrast to the multi-directional movement of the hand truck of the present invention, this device is only capable of forward and backward movement.

The device of U.S. Pat. No. 3,666,285 is capable of forward and backward and side to side movement, but is not capable of rotational movement. In contrast to the two-wheeled hand truck of the present invention which is capable of multi-directional movement, this device has two sets of wheels, a primary set of wheels for forward and backward movement and an auxiliary set of wheels for side to side movement. When one set of wheels is engaged and in contact with the floor, the other set is disengaged and lifted off the floor into a storage position. Furthermore, this device is not capable of rotational movement.

The device of U.S. Pat. No. 3,729,209 is capable of forward and backward and side to side movement, but is not capable of rotational movement. This device has two sets of wheels, a primary set of wheels for forward and backward movement and an auxiliary set of wheels used in conjunction with the primary set of wheels for side to side movement. This device is uniquely adapted for transportation of large long loads such as pool tables, bed springs or the like. In contrast to the hand truck of the present invention, this device is not capable of rotational movement.

The device of U.S. Pat. No. 4,003,584 is a trolley with four sets of articulated, steerable wheels that is of the particular type used in the cinema and television industries to carry a cinema or television camera together with the camera operator for the purpose of taking pictures while in motion. While this device is capable of multi-directional movement, each set of wheels is limited to operation in parallel; whereas, in contrast, the hand truck of the present invention may be moved with the independent wheels parallel to each other for forward and backward movement, in line with each other for side to side movement, or at various angles to each other for rotational movement.

The device of U.S. Pat. No. 4,460,189 is capable of forward and backward and side to side movement. The wheels of this device are semi-spherical in shape and redirection of the wheels is accomplished through manual repositioning of an indexing means. In contrast, the hand truck of the present invention allows for directional repositioning of the wheels through a range of motion of approximately 100 degrees by means of a handgrip and trigger assembly and is capable of forward and backward, side to side and rotational movement.

The device of U.S. Pat. No. 6,039,332 is capable of forward and backward and side to side movement, but is not capable of rotational movement. In this device, the wheels are indexed in parallel to allow for redirected movement of the hand truck and, in contrast to the hand truck of the present invention, the wheels are not capable of independent indexing.

The device of U.S. Pat. No. 6,450,514 is capable of multi-directional movement as accomplished through four caster wheels. Because the wheels are caster wheels, this device is not precisely steerable due to the independent movement of each wheel. In contrast, the hand truck of the present invention is precisely steerable through the positioning of the wheels in various stable indexing positions. Also, this device is particularly designed for transportation of large circular and rectangular sheets.

Lastly, the device of U.S. Pat. No. 6,663,120 is capable of forward and backward and side to side movement. Redirection of the wheels is accomplished through manual repositioning of an indexing means; whereas, in contrast, the hand truck of the present invention allows for directional repositioning of the wheels on-the-fly by means of a trigger assembly. Although this device is stated to be capable of rotational movement, it does not provide a precise, stable means for doing so, but rather relies upon frictional force to maintain the wheels in a non-precise, unstable intermediate indexing position for rotational movement. In contrast, the hand truck of the present invention provides for an indexing means that allows for positioning of the wheels in various precise, stable indexing positions to allow for rotational movement.

SUMMARY OF THE INVENTION

The invention is a hand truck comprising a backing frame which is an inverted u-shape with a backing frame hand grip area that has ninety degree radial bends on each side to communicate with equal length, parallel, longitudinal left and right sides of the backing frame, and load supports for stabilization of the backing frame; a toe plate for supporting loads to be transported, which communicates with the backing frame and which is z-shaped in cross-section to provide a load-bearing platform forward of the backing frame and an elevated platform rearward of the backing frame which contains index position throughholes; and a pair of independent wheel indexing assemblies comprising a hand grip which attaches to an indexing column, which attaches to a wheel mount, which houses a wheel, and a trigger assembly for operation of the wheel indexing assembly comprising a trigger which communicates with a cable which in turn communicates with a latch pin, and the indexing column of the wheel indexing assembly attaches to a side of the backing frame. The wheel indexing assemblies are rotatable through a range of motion of approximately 100 degrees which allows the hand truck to be capable of multi-directional movement.

To operate the hand truck of the present invention, the wheel indexing assembly is pivotally engaged with various indexing positions by means of an operator of the hand truck compressing the trigger, which in turn draws on the cable and disengages the latch pin from an original index position throughhole, and then the operator pivots the wheel indexing assembly to another index position throughhole, releases the trigger, which in turn reengages the latch pin with the other index position throughhole. The hand truck has various index position throughholes which allow for multi-directional movement orientation of the hand truck in a standard direction, a lateral direction and a rotational direction.

BRIEF DESCRIPTION OF THE DRAWINGS

FIG. 4 is a rear plan view of various components of the hand truck of the present invention; wherein FIG. 4A is a plan view of the left side wheel indexing assembly, FIG. 4B is section plan view of the left side hand grip and trigger assembly and FIG. 4C is a section plan view of the left side wheel mount assembly and latch pin assembly.

FIG. 5 is a top plan view of the hand truck of the present invention; wherein the wheels are shown in a standard index position in FIG. 5A, in a lateral index position in FIG. 5B, and in a rotational index position in FIG. 5C. FIG. 5D shows the range of rotational index positions and range of motion of approximately 100 degrees.

FIG. 6 is top plan section view of the toe plate of the hand truck of the present invention; wherein FIG. 6A is a top plan view of the toe plate and FIG. 6B is a cross-section plan view of the toe plate.

DETAILED DESCRIPTION OF THE INVENTION

The hand truck or dolly of the present invention relates to a manually operated, two-wheeled device for transporting materials above a surface, such as a floor, while incorporating a wheel indexing assembly for independently indexing each of two, independent wheels to various index positions for multi-directional movement. The multi-directional movement may occur in a standard wheel index position allowing for standard direction, or forward and backward, movement, a lateral wheel index position allowing for lateral direction, or side to side, movement, and a rotational wheel index position allowing for rotational direction, or rotation about a vertical axis, movement, such as for cornering and circular movement.

The hand truck of the present invention provides an operator with complete control of movement and directional choice for the hand truck without having to remove his hands from a handgrip location to achieve mechanical adjustments of the wheels. Rather, an operator may adjust a wheel index position on-the-fly by means of a wheel indexing assembly to rotate a wheel assembly about a vertical axis of rotation within a range of motion of approximately 100 degrees.

DETAILED DESCRIPTION OF THE DRAWINGS

The hand truck of the present invention is further described and disclosed by reference to the drawings.

Figure 1:
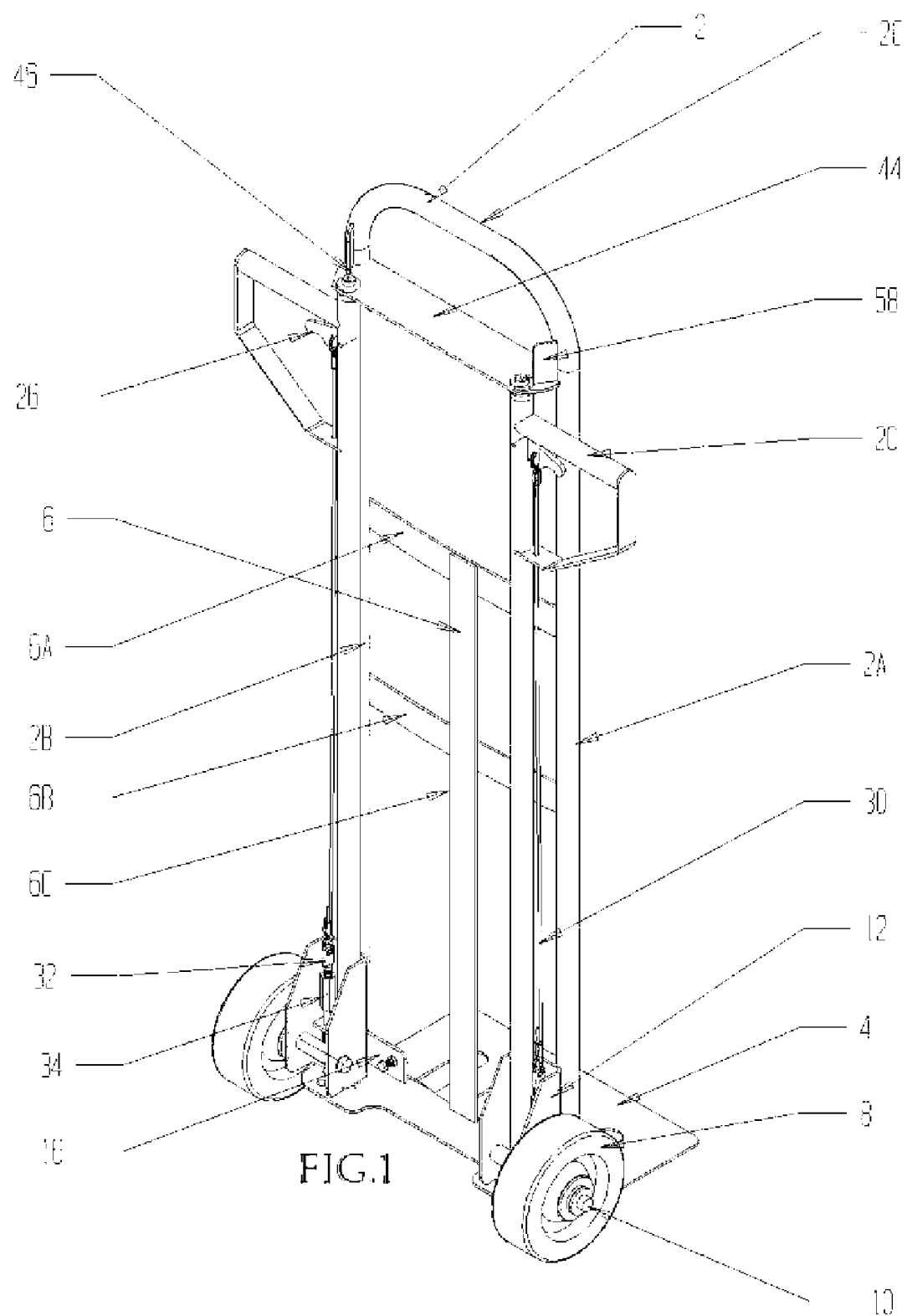
FIG. 1 is a rear plan view of the hand truck of the present invention with its wheels in a standard index position which allows for forward and backward movement.

The hand truck of the present invention as shown in FIG. 1 is comprised of a backing frame 2; wherein the backing frame 2 is further comprised of a right side backing frame 2A, a left side backing frame 2B and a backing frame hand grip area 2C. The backing frame 2 communicates with load supports 6; wherein preferably there is at least one horizontal crossbar load support 6A, 6B and at least one vertical crossbar load support 6C. The load supports 6A, 6B, 6C allow for stabilization of the backing frame 2. The backing frame sides 2A, 2B communicate with a toe plate 4 which supports and carries a load.

Preferably, the frame 2 of the hand truck of the present invention comprises a primary body structure of a unitary, tubular metal construction. The frame 2 is an inverted u-shape; wherein, a backing frame hand grip area 2C has ninety degree radial bends on each side to communicate with equal length, parallel, longitudinal backing frame sides 2A, 2B which in turn communicate with a toe plate 4.

The toe plate 4, FIG. 1 supports a load to be transported with the hand truck of the present invention and communicates with the backing frame 2. The toe plate 4, FIG. 6 is preferably z-shaped as viewed in cross-section and provides a load-bearing platform 64 forward of the backing frame 2, FIG. 1 and an elevated platform 66, FIG. 6 rearward of the backing frame 2, FIG. 1. The elevated platform 66 of the toe plate 4 contains index position throughholes 42 which allow for indexing of the wheels 8, as further discussed below.

Figure 2:
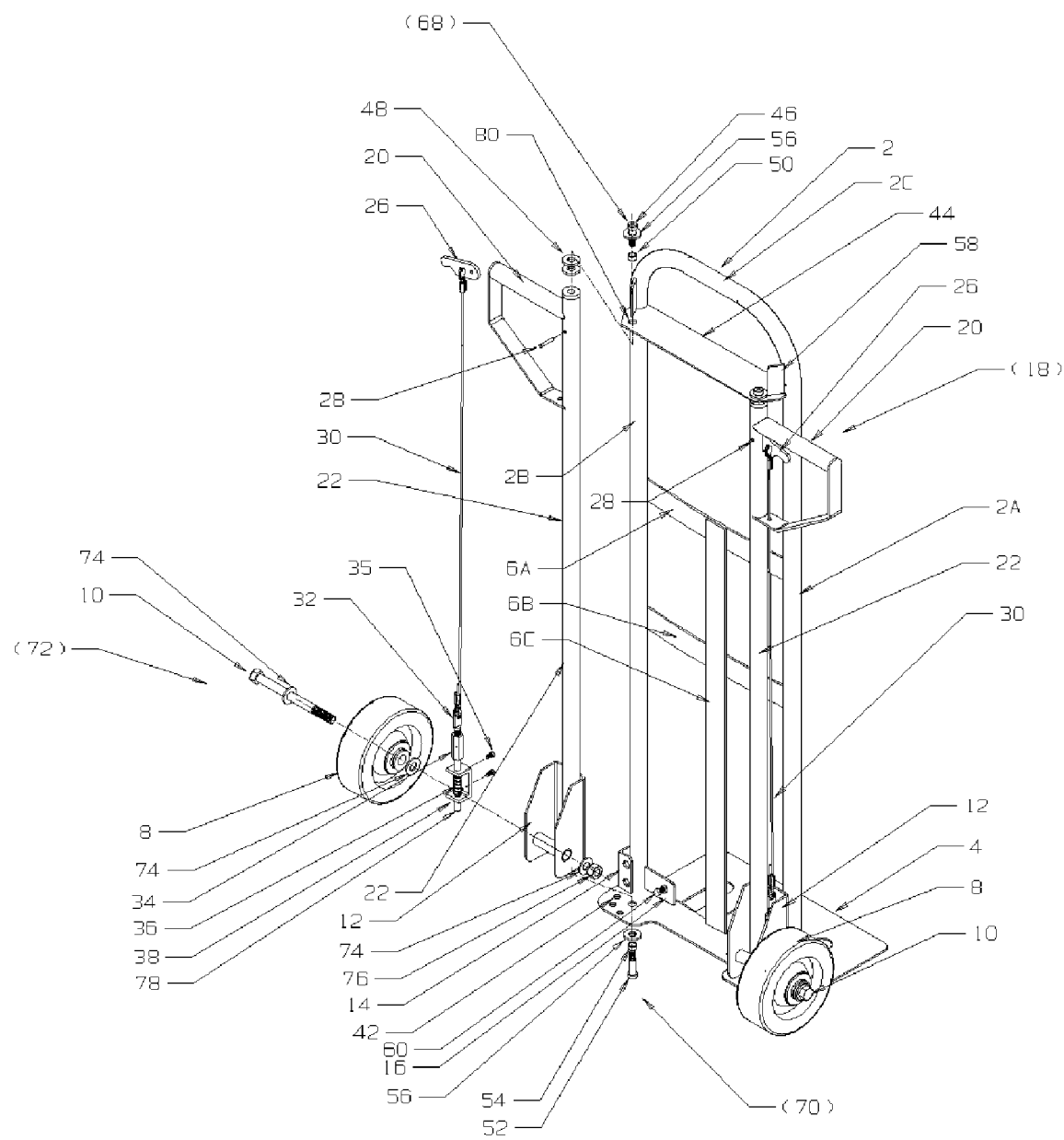
FIG. 2 is a rear plan view of the hand truck of the present invention with its wheels in a standard index position which allows for forward and backward movement; wherein the left side of the hand truck is shown in an expanded view.
Figure 3:
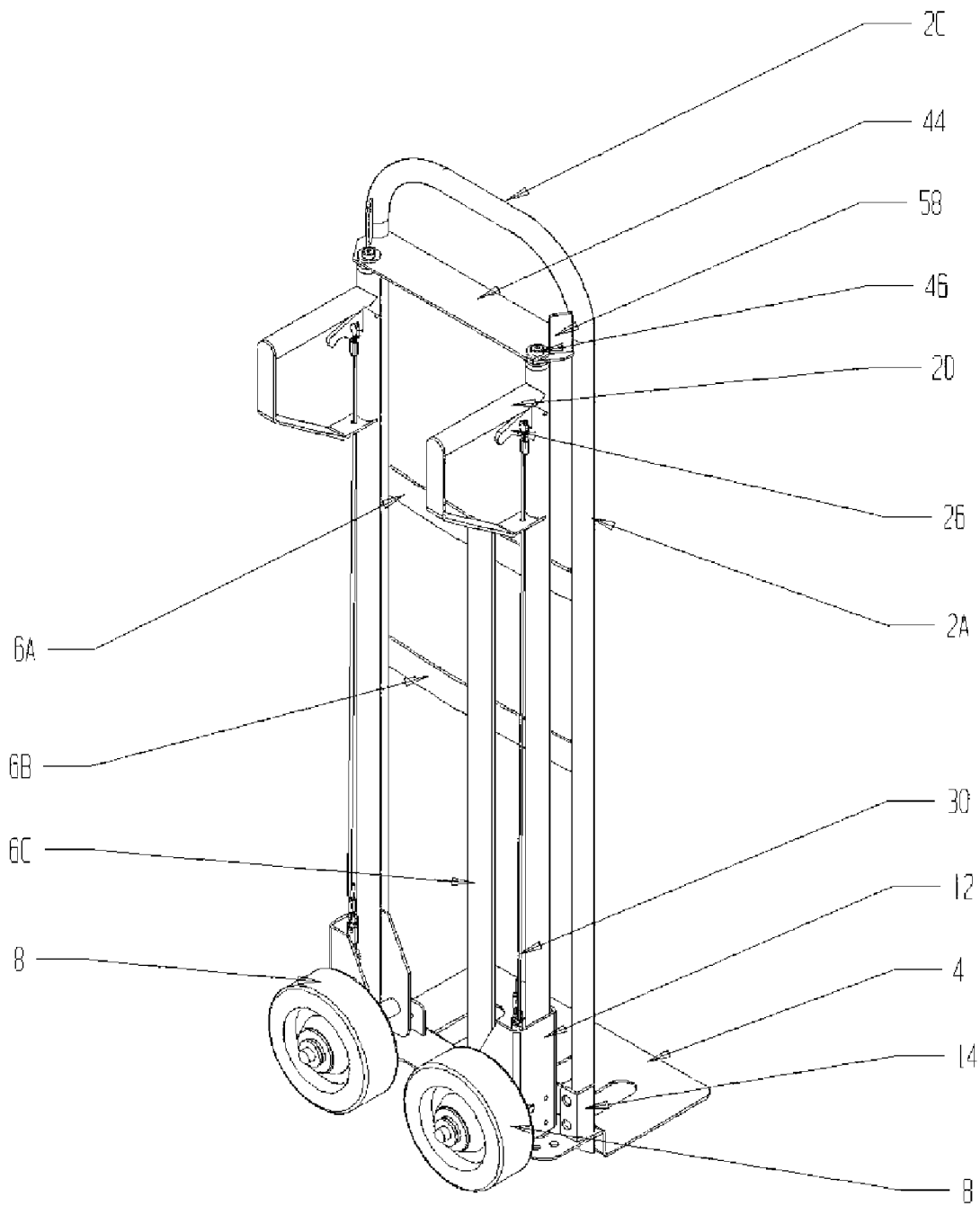
FIG. 3 is a rear plan view of the hand truck of the present invention with its wheels in a lateral index position which allows for side to side movement.

The hand truck of the present invention as shown in FIG. 2 is further comprised of a right side wheel indexing assembly 18 and a left side wheel indexing assembly 18 which are independent of each other and each of which communicates with the backing frame 2. The wheel indexing assembly 18 is further comprised of a hand grip 20 which preferably fixedly attaches, such as by welding, to an indexing column 22 of the wheel indexing assembly 18.

The wheel indexing assembly 18 communicates with the backing frame 2 by means of an indexing column 22 which attaches to an angle bracket 44 toward the top of the backing frame 2 and to the rear platform 66 of the toe plate 4. The angle bracket 44 preferably fixedly attaches, such as by welding, to the backing frame 2 and is further strengthened by support gusset straps 58 which attach to both the angle bracket 44 and the backing frame 2.

The wheel indexing assembly 18 communicates with the backing frame 2 by means of an indexing column 22 which attaches to the angle bracket 44 preferably by means of a top shoulder bolt assembly 68. The indexing column 22 also preferably fixedly attaches, such as by welding, to wheel mount 12 which in turn communicates with the toe plate 4 of the backing frame 2 by means of a bottom shoulder bolt assembly 70.

The top shoulder bolt assembly 68 is comprised of top shoulder bolts 46, top pivot bushings 50 and top spacer washers 48. The bottom shoulder bolt assembly 70 is comprised of bottom shoulder bolts 52, bottom pivot bushings 54 and bottom spacer washers 56. The bottom shoulder bolts 52 pass through bottom shoulder bolt throughholes 40, FIG. 6 and engage the toe plate 4. The bottom shoulder bolts 52 serve as axes of rotation for the wheel indexing assembly 18.

The wheel mount assembly 12 provides for mounting of the wheels 8 by means of an axle assembly 72. The axle assembly 72 is comprised of an axle 10, axle spacer washers 74 and an axle nut 76.

The wheels 8 are independent of each other and each has its own axle 10. The independent axles 10 allow the wheels 8 to be indexed independently of each other and in either symmetrical or non-symmetrical fashion. When the wheels 8 are in a standard index position to enable forward and backward movement of the hand truck of the present invention, the wheel mount 12 rests against a wheel stop 14. When the wheels 8 are in a lateral index position to enable lateral, or side to side (left-to-right and right-to-left), movement of the hand truck of the present invention, the wheel mount 12 rests against an adjustment bolt 60 which attaches by means of a throughhole in the pivot stop 16. The adjustment bolt 60 provides adjustment to enable stop positions through a range of motion of approximately 100 degrees to permit operator steerability.

The wheels 8 may be changed among a standard index position, a lateral index position and a rotational index position by means of a wheel indexing assembly 18. The wheel indexing assembly 18 is further comprised of a trigger assembly 82, FIG. 4B.

The trigger assembly 82, FIG. 4B is comprised of a trigger 26 which communicates with a cable 30, which in turn communicates with a latch pin assembly 62, FIG. 4C. The trigger 26 passes through a trigger-receiving throughhole 24 in indexing column 22 and is preferably attached thereto by means of a trigger spring pin 28.

The cable 30 communicates with a threaded eye bolt 32 which passes through a threaded eye bolt sleeve 34. The threaded eye bolt sleeve 34 rests upon a latch pin bracket 38 of a latch pin assembly 62.

The latch pin assembly 62 is comprised of a unshaped latch pin bracket 38, a latch pin spring 36 and a latch pin 78. The threaded eye bolt 32, which is engaged with the trigger cable 30, passes through the threaded eye bolt sleeve 34 and into the latch pin bracket 38 by means of a latch pin bracket 38 throughhole, then through a latch pin spring 36 to engage the latch pin 78. The latch pin 78 in turn engages with one of the index position throughholes 42, FIG. 6.

When an operator of the hand truck of the present invention operates the trigger assembly 82 and compresses the trigger 26, the latch pin 78 is disengaged from an index position throughhole 42 and is able to be moved among the various index positions and re-engaged with another index position throughhole 42, FIG. 6. If the latch pin 78 is engaged with a standard index position throughhole 42A, then the hand truck may be moved forward and backward. If the latch pin 78 is engaged with a lateral index position throughhole 42B, then the hand truck may be moved laterally or from side to side. If the latch pin 78 is engaged with a rotational index position throughhole 42C, then the hand truck may be moved rotationally about a vertical axis of the wheel indexing assembly 18.

What is claimed is:

1. A hand truck comprising a backing frame, wherein said backing frame is an inverted u-shape with a backing frame hand grip area that has ninety degree radial bends on each side to communicate with equal length, parallel, longitudinal left and right sides of said backing frame, further wherein said backing frame further comprises load supports for stabilization of said backing frame; a toe plate for supporting loads to be transported and which communicates with said backing frame, wherein said toe plate is z-shaped in cross-section and which provides a load-bearing platform forward of said backing frame and an elevated platform rearward of said backing frame, further wherein said elevated platform of said toe plate contains index position throughholes; and a pair of independent wheel indexing assemblies which communicate with said backing frame and said toe plate, wherein each of said independent wheel indexing assemblies are independently rotatable through a range of motion of approximately 100 degrees which allows said hand truck to be capable of multi-directional movement in a standard direction, a lateral direction and a rotational direction.

2. The hand truck of claim 1, wherein each of said wheel indexing assemblies further comprises a hand grip which attaches to an indexing column which attaches to a wheel mount which houses a wheel, and a trigger assembly for operation of said wheel indexing assembly, further wherein said indexing column attaches to a side of said backing frame.

3. The hand truck of claim 2, wherein said trigger assembly is further comprised of a trigger which communicates with a cable which in turn communicates with a latch pin.

4. The hand truck of claim 3, wherein said wheel indexing assembly pivotally engages with various indexing positions by means of an operator of said hand truck compressing said trigger, which in turn draws on said cable and disengages said latch pin from an original index position throughhole, and then said operator pivots said wheel indexing assembly to another index position throughhole, releases said trigger, which in turn reengages said latch pin with said other index position throughhole.

5. The hand truck of claim 4, wherein said index position throughholes allow for multi-directional movement orientation of said hand truck in a standard direction.

6. The hand truck of claim 4, wherein said wheel index position throughholes allow for multi-directional movement orientation of said hand truck in a lateral direction.

7. The hand truck of claim 4, wherein said wheel index position throughholes allow for multi-directional movement orientation of said hand truck in a rotational direction.

8. A hand truck comprising a backing frame, wherein said backing frame is an inverted u-shape with a backing frame hand grip area that has ninety degree radial bends on each side to communicate with equal length, parallel, longitudinal left and right sides of said backing frame, further wherein said backing frame further comprises load supports for stabilization of the backing frame; a toe plate for supporting loads to be transported and which communicates with said backing frame, wherein said toe plate is z-shaped in cross-section and which provides a load-bearing platform forward of said backing frame and an elevated platform rearward of said backing frame, further wherein said elevated platform of the toe plate contains index position throughholes; a pair of independent wheel indexing assemblies comprising a hand grip which attaches to an indexing column, which attaches to a wheel mount, which houses a wheel, and a trigger assembly for operation of said wheel indexing assembly comprising a trigger which communicates with a cable which in turn communicates with a latch pin, further wherein said indexing column attaches to a side of said backing frame; wherein each of said independent wheel indexing assemblies are independently rotatable through a range of motion of approximately 100 degrees which allows said hand truck to be capable of multi-directional movement in a standard direction, a lateral direction and a rotational direction.

9. The hand truck of claim 8, wherein said wheel indexing assembly is pivotally engaged with various indexing positions by means of an operator of said hand truck compressing said trigger, which in turn draws on said cable and disengages said latch pin from an original index position throughhole, and then said operator pivots said wheel indexing assembly to another index position throughhole, releases said trigger, which in turn reengages said latch pin with said other index position throughhole.

10. The hand truck of claim 8, wherein said index position throughholes allow for multi-directional movement orientation of said hand truck in a standard direction.

11. The hand truck of claim 8, wherein said index position throughholes allow for multi-directional movement orientation of said hand truck in a lateral direction.

12. The hand truck of claim 8, wherein said index position throughholes allow for multi-directional movement orientation of said hand truck in a rotational direction.

* * * * *